United States Patent
Yang et al.

(10) Patent No.: US 8,422,802 B2
(45) Date of Patent: Apr. 16, 2013

(54) ROBUST LARGE-SCALE VISUAL CODEBOOK CONSTRUCTION

(75) Inventors: Linjun Yang, Beijing (CN); Darui Li, Lianyungang (CN); Xian-Sheng Hua, Bellevue, WA (US); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 13/077,735

(22) Filed: Mar. 31, 2011

(65) Prior Publication Data

US 2012/0251007 A1 Oct. 4, 2012

(51) Int. Cl.
*G06K 9/36* (2006.01)
(52) U.S. Cl.
USPC .......................................................... 382/232
(58) Field of Classification Search .................. 382/155, 382/159, 170, 224, 225, 227; 704/222, 245, 704/E19.001; 707/737, E17.046, E17.047, 707/E17.089, E17.091, E17.092
See application file for complete search history.

(56) References Cited

U.S. PATENT DOCUMENTS

| 5,890,110 | A * | 3/1999 | Gersho et al. ................. 704/222 |
| 2003/0012446 | A1 | 1/2003 | Thomas et al. |
| 2009/0003660 | A1 | 1/2009 | Das |
| 2010/0174539 | A1 | 7/2010 | Nandhimandalam et al. |

OTHER PUBLICATIONS

Gonzalez, et al. "NMF-based Multimodal Image Indexing for Querying by Visual Example"—Published Date: 2010 http://www.informed.unal.edu.co/jccaicedo/papers/civr10-cam.pdf 8 pages.
Moosmann, et al. "Fast Discriminative Visual Codebooks using Randomized Clustering Forests"—Retrieved Date: 2007 http://lear.inrialpes.fr/pubs/2006/MTJ06/MTJ-nips06.pdf, 7 pages.
Ohbuchi, et al. "Salient Local Visual Features for Shape-Based 3D Model Retrieval"—Published Date: 2008 http://www.kki.yamanashi.ac.jp/~ohbuchi/online_pubs/SMI2008/SMI08_ohbuchi_bagof_localvisualfeatures_web.pdf 10 pages.
Teynor, et al. "Fast Codebook Generation by Sequential Data Analysis for Object Classification"—Published Date: 2007 http://lmb.informatik.uni-freiburg.de/people/teynor/teynorISVC2007.pdf 11 pages.
Yang, et al. "Unifying Discriminative Visual Codebook Generation with Classifier Training"—Published Date: 2008 http://www.cs.cmu.edu/~liuy/cvpr2008-unified.pdf 8 pages.

* cited by examiner

*Primary Examiner* — Jose Couso
(74) *Attorney, Agent, or Firm* — Lee & Haynes PLLC

(57) ABSTRACT

Techniques for construction of a visual codebook are described herein. Feature points may be extracted from large numbers of images. In one example, images providing N feature points may be used to construct a codebook of K words. The centers of each of K clusters of feature points may be initialized. In a looping or iterative manner, an assignment step assigns each feature point to a cluster and an update step locates a center of each cluster. The feature points may be assigned to a cluster based on a lesser of a distance to a center of a previously assigned cluster and a distance to a center derived by operation of an approximate nearest neighbor algorithm having aspects of randomization. The loop terminates when the feature points have sufficiently converged to their respective clusters. Centers of the clusters represent visual words, which may be used to construct the visual codebook.

20 Claims, 6 Drawing Sheets

ROBUST LARGE-SCALE VISUAL CODEBOOK CONSTRUCTION

BACKGROUND

A content-based image retrieval system may utilize a visual codebook. For example, vectors representing patches or regions of images may be considered "feature points" or words. Such feature points may be extracted from images by a Scale Invariant Feature Transform (SIFT). Once extracted, the feature points may be quantized into visual words. This is a critical step, and may be based on K-means clustering. If the feature points are appropriately assigned to clusters in a manner that fosters convergence to representative centers or code words, the codebook may be constructed. Once constructed, the codebook will enable image retrieval using classical information retrieval techniques. However, the number of images and the number of features points may be huge. Accordingly, scalability problems are present.

Hierarchical K-means (HKM) and Approximate K-means (AKM) may be used to address scalability—particularly to configure clusters of feature points that converge onto an appropriate center. However, both methods have problems. In particular, HKM suffers from performance degradation as clusters are decomposed into smaller-scale clustering. Additionally, AKM requires that selection of an approximate nearest neighbor be of sufficient precision to achieve reasonable performance. Moreover, AKM is not guaranteed to converge, which makes algorithm termination difficult.

SUMMARY

A content-based image retrieval system may utilize a visual codebook. To construct a codebook, feature points representing patches or regions may be extracted from large numbers of images. Then, the feature points may be clustered to form a codebook, such as by K-means clustering. The feature points are then quantized into the code words to generate a bag-of-words representation of images, which will enable image retrieval using classical information retrieval techniques.

In one example, images providing N feature points may be used to construct a codebook of K words. The centers of each of K clusters may be initialized, wherein the clusters represent groupings of a distribution of the N feature points. In a looping or iterative manner, an assignment step assigns each feature point to a cluster and an update step locates a center of each cluster. The feature points may be assigned to a cluster based on a lesser of a distance to a center of a previously assigned cluster and a distance to a center derived by operation of an approximate nearest neighbor algorithm having aspects of randomization. The loop terminates when the feature points have sufficiently converged to their respective clusters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

The disclosure describes examples of visual codebook construction and operation in the context of a large-scale image retrieval system. To construct a visual codebook, feature points representing patches or regions may be extracted from large numbers of images. The feature points may be quantized into visual words, such as by K-means clustering. By balancing aspects of history and randomness in assigning the feature points to clusters, rapid convergence of the clusters may be achieved. Centers of the clusters become visual words, from which the codebook is constructed. When completed, the codebook will enable image retrieval using classical information retrieval techniques, such as information retrieval techniques based on word searching.

In one example, images provide N feature points that may be used to construct a codebook of K words. The centers of each of K clusters may be initialized, wherein the clusters represent groupings of a distribution of the N feature points. In a looping or iterative manner, an assignment step assigns each feature point to a cluster and an update step locates a center of each cluster. The feature points may be assigned to a cluster based on a lesser of a distance to a center of a previously assigned cluster and a distance to a center derived by operation of an approximate nearest neighbor algorithm having aspects of randomization. The loop terminates when the feature points have sufficiently converged to their respective clusters.

The discussion herein includes several sections. Each section is intended to be non-limiting. More particularly, this entire description is intended to illustrate components which may be utilized in visual codebook construction, but not components which are necessarily required. The discussion begins with a section entitled "Example Image Retrieval System," which describes one environment that may implement the techniques described herein. This section depicts and describes large-scale visual codebook construction using a high-level architecture. Next, a section entitled "Illustrated Algorithm Example" illustrates and describes aspects of feature point assignment and update of cluster centers. The cluster centers resulting from an iterative assignment and update process will form visual words in the construction of the codebook. A section, entitled "Example Flow Diagrams" illustrates and describes techniques that may be used in visual codebook construction. A section, entitled "Example Algorithm" illustrates and describes a further example of an algorithm that may be used in visual codebook construction. Finally, the discussion ends with a brief conclusion.

This introduction, including section titles and corresponding summaries, is provided for the reader's convenience and is not intended to limit the scope of the claims or any section of this disclosure.

Example Image Retrieval System

Figure 1:
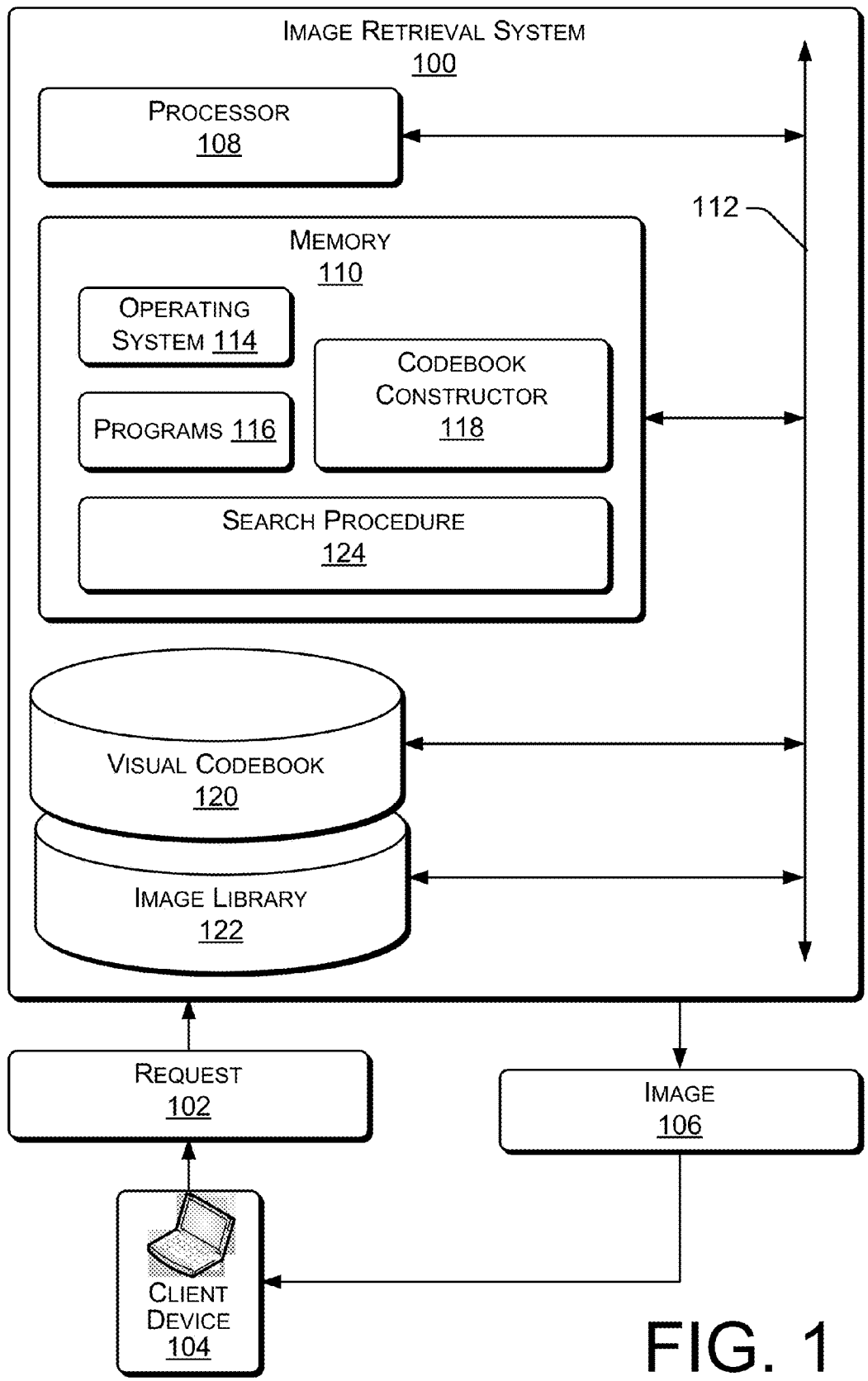
FIG. 1 is a diagram illustrating an example system implementing large-scale visual codebook construction.

FIG. 1 is a diagram illustrating an example image retrieval system 100 configured to implement large-scale visual codebook construction, codebook maintenance and codebook operation. In an example operation, the image retrieval system 100 receives a request 102 for an image from a client 104. The image retrieval system 100 retrieves an appropriate image 106, which is delivered to the client 104.

The image retrieval system 100 may include a processor 108 and memory 110. The processor 108 may be configured communicate with a memory device 110 over a bus or other network 112. The processor 108 may additionally be configured to execute program statements defined in the memory 110. In particular, the memory 110 may include an operating system 114, one or more programs 116, a codebook constructor 118 and a search procedure or function 124.

The codebook constructor 118 may be a software program, procedure and/or function defined in memory (e.g., memory 110). The codebook constructor 118 may be configured to create and/or maintain a visual codebook 120. The codebook constructor 118 may obtain an input of images (or portions, regions or "patches" of images), such as from an image library 122. Using regions of the images, the codebook constructor 118 may create feature points, which represent "features" of the regions of the images. The feature points may be constructed by operation of a Scale Invariant Feature Transform (SIFT) algorithm or similar. In one example, the feature points may use a vector format to represent a region of an image. Using the feature points, the codebook constructor 118 may calculate "visual words" by operation of an algorithm. In one example, the algorithm iteratively assigns each a plurality of feature points to one of a plurality of clusters and updates centers of each cluster following assignment. The assignment of the feature points may utilize aspects of both assignment history and randomization. The update of any given center may or may not move that center. The iterative process continues until convergence of the assignments of the feature points to clusters is achieved. Using the centers—obtained after convergence of the clusters—as visual words, the codebook constructor 118 is able to create and populate the visual codebook 120.

Thus, the visual codebook 120 may include a plurality of "visual words." The visual words may be the centers obtained from the algorithm operating on the codebook constructor 118. In particular, as the assignments of the feature points result in convergence of each feature point to a particular cluster of feature points, the centers of those clusters becomes visual words, for incorporation into the visual codebook 120. As images are added to the image library 122, additional patches or regions of images may be obtained. Accordingly, additional feature points may be obtained from the regions. This may result in different clustering, as the feature points converge and therefore different centers of the clusters. Thus, some maintenance of the visual codebook 120 may result, as the image library is expanded, contracted and/or altered.

The image library 122 may include a plurality of different images. The images may be indexed as indicated by a preferred system, such as by the visual codebook 120. The image library 122 may be configured for searching by the search procedure 124.

The search procedure 124 may be configured to search the image library 122 for an image, such as according to the request 102 from the client 104. Because the codebook constructor 118 has quantized feature points and/or local features into visual words within the visual codebook 120, the search procedure 124 may employ classical information retrieval techniques to obtain a desired image from the image library 122, such as by using the visual codebook 120.

Illustrated Algorithm Example

FIGS. 2A-E constitute a sequence of diagrams illustrating an example of an iterative process by which feature points are assigned to clusters and centers of each cluster are updated. Upon convergence of the feature points to their respective clusters, the centers of each cluster can be used as visual words to populate a visual codebook.

Figure 2A:
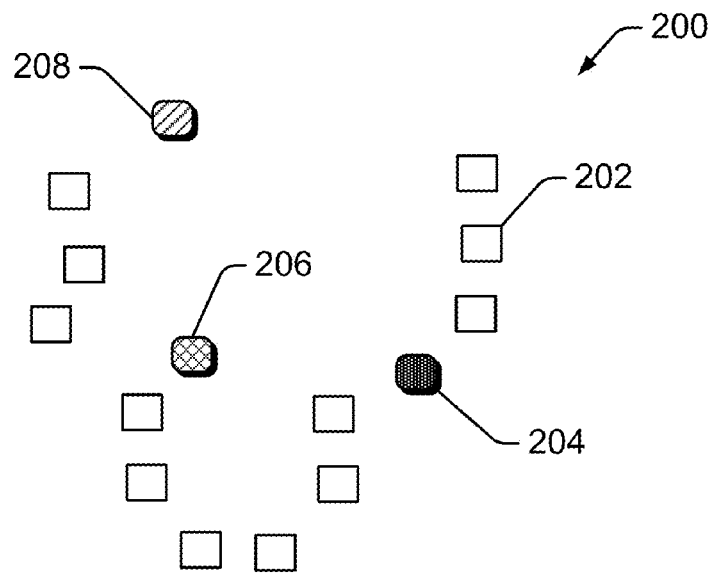
FIGS. 2A-E constitute a sequence of diagrams illustrating an example of iterative assignment of feature points into clusters, iterative updating of centers of each cluster, and formation of a visual codebook using visual words derived from the centers upon convergence of the clusters.

Referring first to FIG. 2A, a distribution 200 of feature points 202 constitute input data to the iterative process or algorithm. A plurality of centers 204, 206 and 208 may be assigned to arbitrary locations. Accordingly, input to an algorithm, comprising a plurality of the feature points 202 and the centers 204-208, is provided.

Figure 2B:
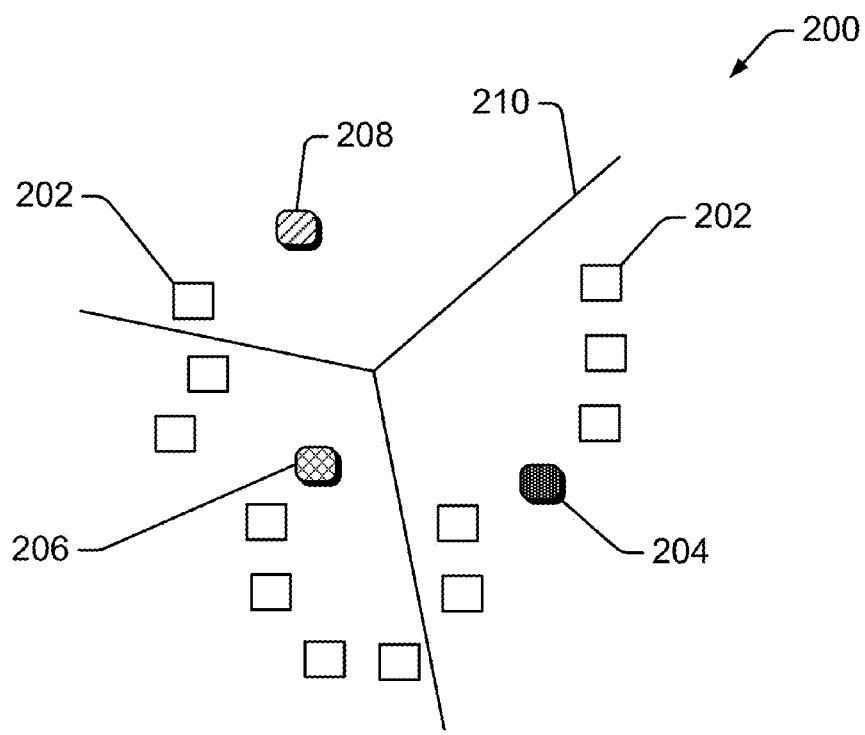

Referring to FIG. 2B, an assignment step is illustrated. By operation of the assignment step, each of the feature points 202 of the distribution 200 is assigned to one of a plurality of clusters. In the example of FIG. 2B, three clusters are formed, as indicated by a partition 210. In this example, the clusters are formed by assigning each feature point to a center to which it is closest. Accordingly, one cluster is formed in association with each center 204-208. While assignment of each feature point to a center that is closest may provide greater accuracy, in a real world (e.g., web-scale or Internet-scale) example, this may be computationally infeasible. Accordingly, an approximate K-means (AKM) method may be used to replace the exact search for the closest cluster centers. For example, an efficient Approximate Nearest Neighbor (ANN) search method employing a k-d tree may be used.

Thus, the assignment step can assign the $n^{th}$ feature point, at the $t^{th}$ iteration, to a cluster according to an element, $\hat{a}_n^t$, of an assignment vector, $\hat{a}^t$, based on ANN or alternatively used algorithm.

The assignment step, by which a feature point is assigned to a cluster, may be improved by introducing an aspect of historical assignment. In particular, the $n^{th}$ feature point, at the $t-1^{th}$ iteration (i.e., the iteration immediately before the $t^{th}$ iteration), may have been assigned to a cluster according to an assignment $\tilde{a}_n^{(t-1)}$ (that is, the assignment vector is different for each iteration). The center of that cluster, at that iteration, was $$\mu_{\tilde{a}_n^{(t-1)}}^{(t-1)}.$$

To introduce a historical aspect, the assignment, for the $n^{th}$ feature point, for the $t^{th}$ iteration, can be selected as either the cluster indicated by the ANN algorithm, $\hat{a}_n^t$, or the cluster indicated by the past assignment, $\tilde{a}_n^{(t-1)}$. More particularly, the assignment for the $t^{th}$ iteration may be calculated as shown in Equation 1:

$$\tilde{a}_n^{(t)} = \begin{cases} \hat{a}_n^{(t)}, & \text{if } \|x_n - \mu_{\hat{a}_n^{(t)}}^{(t-1)}\|^2 < \|x_n - \mu_{\tilde{a}_n^{(t-1)}}^{(t-1)}\|^2 \\ \tilde{a}_n^{(t-1)}, & \text{otherwise}. \end{cases} \quad \text{Eqn. (1)}$$

Accordingly, each feature point may be assigned to a cluster by an element in an assignment vector, such that the assignment is the better of: (1) the assignment of the previous iteration, $\tilde{a}_n^{(t-1)}$; and (2) the current assignment proposed by an index derived from an ANN and alternative algorithm for the current iteration, $\hat{a}_n^t$. (Note: "better" assignment may indicate that the feature point is assigned to the cluster having a center that is closer to the feature point, between the center to which the feature point was previously associated and the center suggested by the ANN or alternatively used algorithm).

In addition to introduction of a historical aspect, the assignment step (by which a feature point is assigned to a cluster) may also be improved by introducing an aspect of randomness to the ANN or alternatively used algorithm. In one example, the randomness may be different in every iteration or loop of the algorithm. The randomness may be introduced in any way desired. For example, the randomness may be introduced by using a tree, such as a k-d tree. For example, one dimension of the k-d tree may be selected randomly to split a data space. Alternatively or additionally, a different tree may be used for each iteration. Thus, the randomness may be introduced into the elements $\hat{a}_n^t$ of the assignment vector.

The randomness in generating a current index (such as by operation of ANN or alternative algorithm) and the use of historical assignment may operate synergistically on some iterations. For example, the randomness may assist a feature point to break away from a cluster to which it should not belong. Similarly, the use of historical assignments tends to balance the randomness from moving a feature point into a mistaken location that may require several iterations to undo.

Thus, in the example of FIG. 2B, a selected algorithm (e.g., ANN), perhaps influenced by random aspects, and perhaps influenced by historical aspects, may be used to configured assignments for each of the feature points to a particular cluster.

Figure 2C:
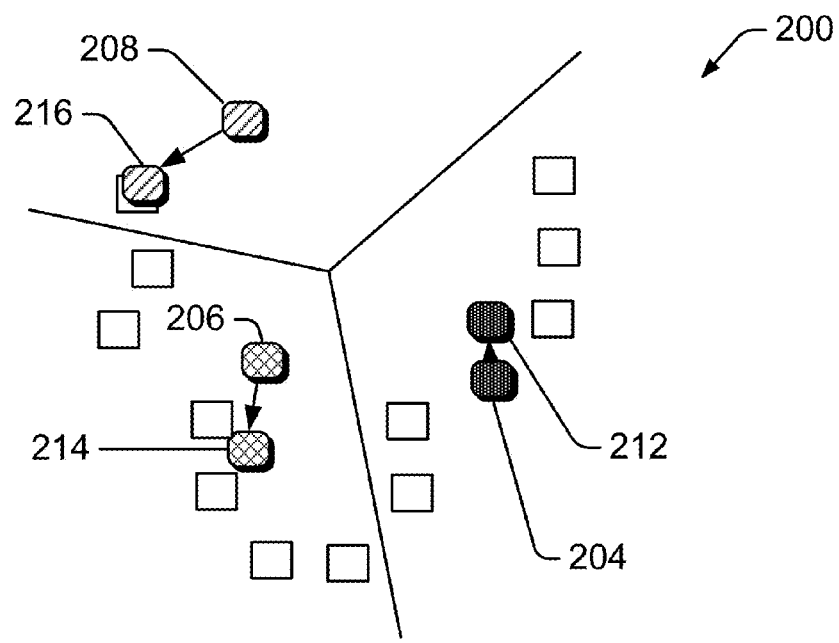

FIG. 2C illustrates an update step. By operation of the update step, the centers 204-208 are moved to a central location within each cluster. Because one or more feature point may have been assigned to, or lost from, any particular cluster, the update step may be required to more properly position the center of the cluster. Thus, the centers may move with each iteration, but the feature points may remain stationary. In one example, each center moves to a centroid or geometric center of each cluster. In the example of FIG. 2C, the centers 204, 206, and 208 are seen moving to new locations 212, 214, and 216, respectively.

Figure 2D:
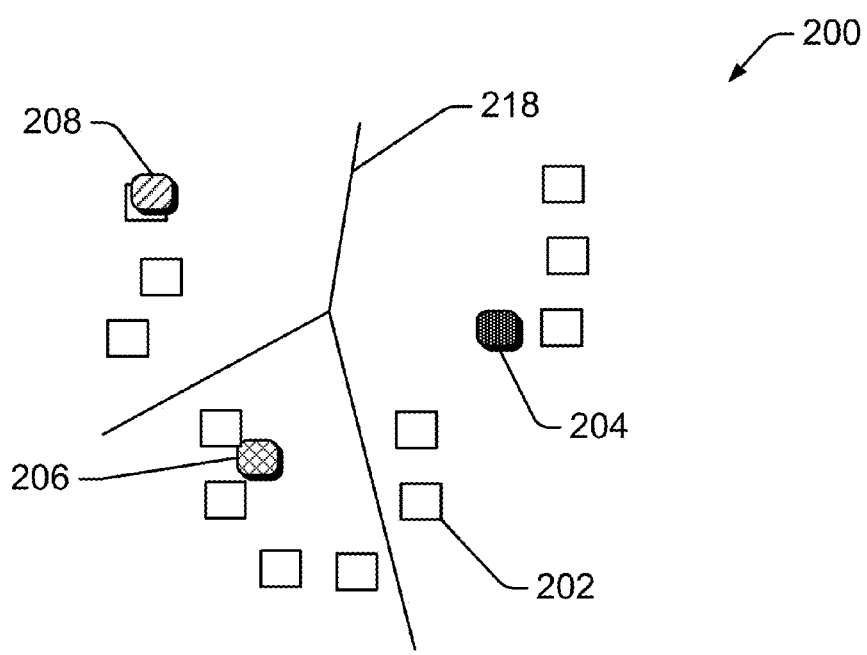

Referring to FIG. 2D, a further assignment step is illustrated. By operation of the assignment step, each of the feature points 202 is assigned to one of a plurality of clusters. Because the center 204-208 of each cluster may have moved in the update step of a previous iteration, each feature point may be more properly assigned to a different cluster. Thus, an updated partition 218 is used to indicate an assignment of each feature point to an appropriate cluster, the cluster having a center to which that feature point is (at least approximately) closer than any other center. As discussed with respect to FIG. 2B, computational efficiency may indicate use of an Approximate Nearest Neighbor (ANN) method for assigning the feature points to particular clusters. Thus, the ANN method may be used to discover an approximately closest center, and assign the feature point to the cluster represented by that center. As noted above, this may be influenced by one or more of random aspects and historical aspects.

Thus, the assignment of feature points to clusters (illustrated by FIGS. 2B and 2D) and the update of the centers of each cluster to reflect changes in assignments (illustrated by FIG. 2C) may be repeated in an iterative manner.

Figure 2E:
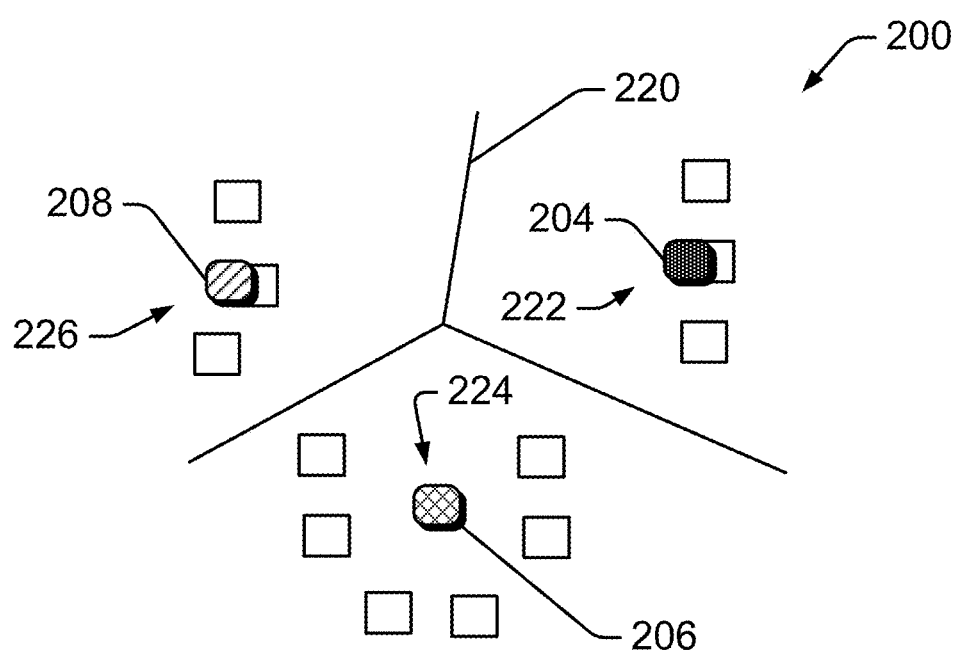

Referring to FIG. 2E, at some point in the iterative process, the assignment of most or all of the feature points may be unchanged. For example, most or all of the feature points are assigned to a same cluster in two consecutive iterations. At that point, the algorithm may be said to have converged to a solution. Convergence may be indicated by satisfaction of a termination condition. The termination condition may require that a set number or percentage of the feature points 202 have an unchanged assignment, based on comparison to a previous iteration.

As seen in FIG. 2E, an assignment partition 220, which corresponds to an assignment vector assigning each feature point to a cluster, appears to have partitioned the feature points in a manner that indicates convergence. At convergence, a solution has been reached. The solution may be considered to be the center points 204, 206, and 208 of the clusters which are now at locations 222, 224, and 226, respectively. In particular, the center points may be considered to be "visual words," which may be used to populate a visual codebook (e.g., visual codebook 120 of FIG. 1). Thus, at convergence, the center points are representative of the feature points in the clusters. The feature points were derived from regions in images. Thus, a codebook contains visual words that are representative of regions within a plurality of images and provides an adaptation to allow classical information retrieval techniques to be used in an image search.

Example Flow Diagrams

Figure 3:
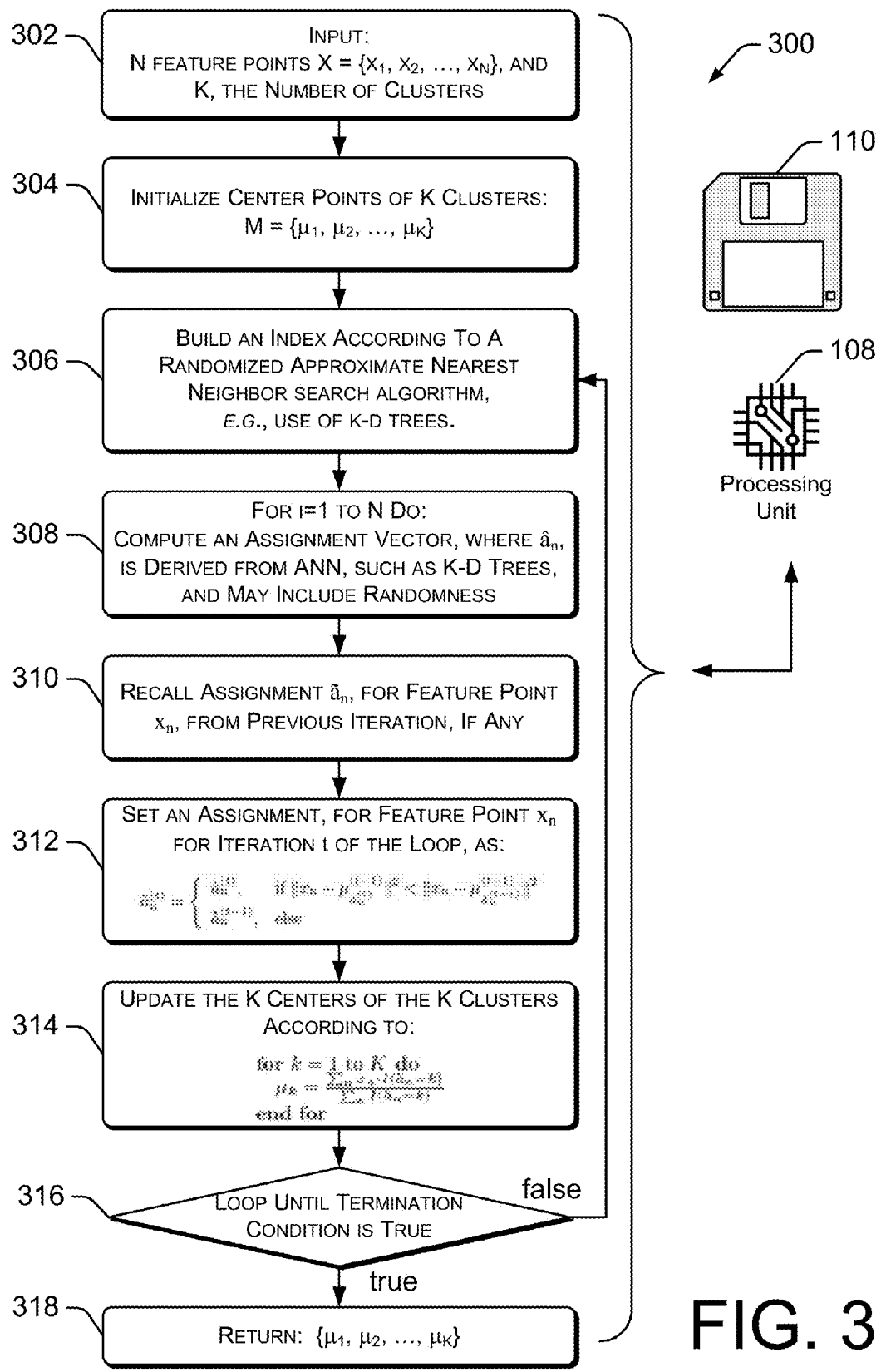
FIG. 3 is a flow diagram illustrating an example process by which a visual codebook may be constructed.
Figure 4:
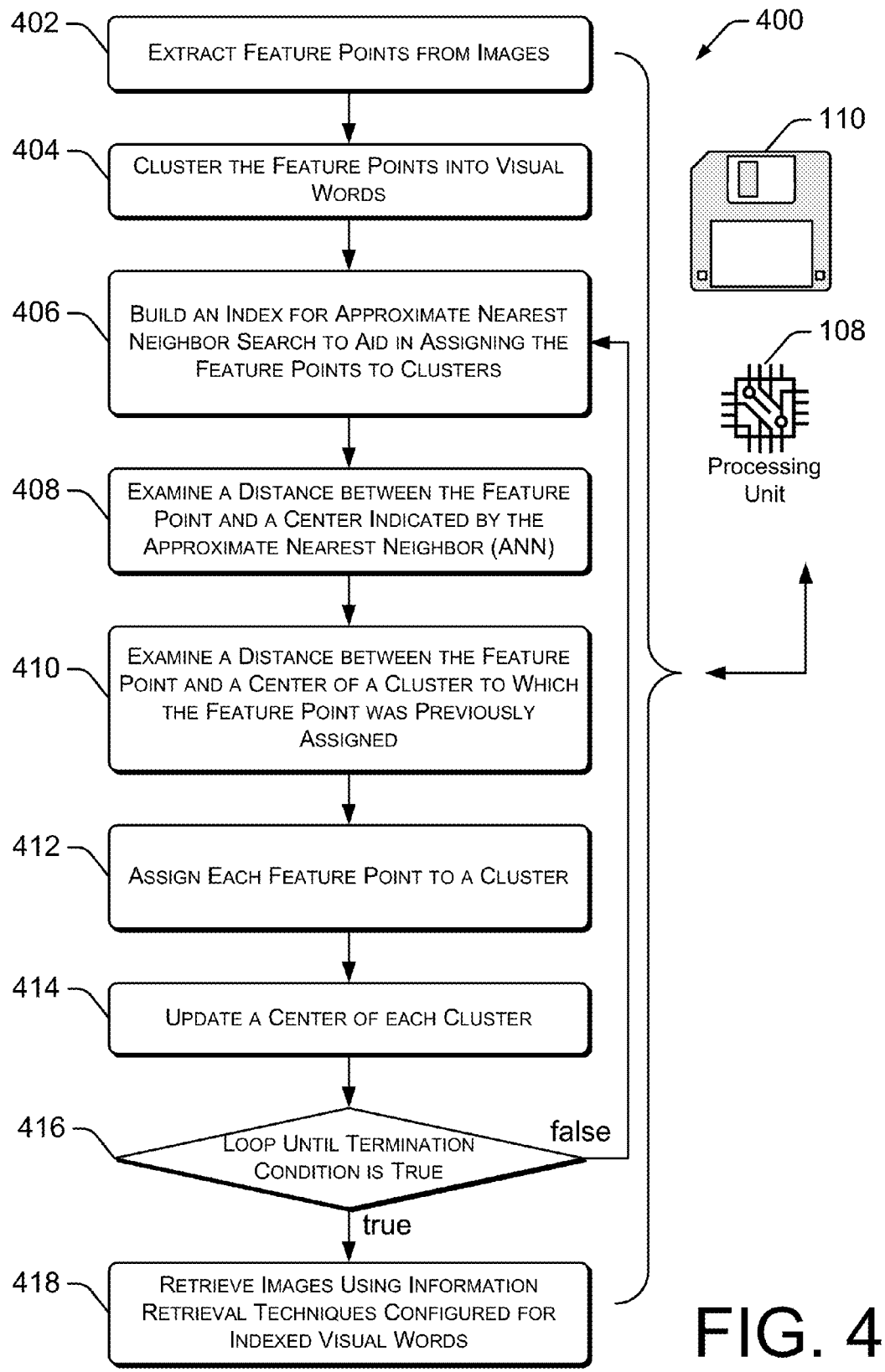
FIG. 4 is a flow diagram illustrating a further example process by which a visual codebook may be constructed.

The example processes of FIGS. 3-4 can be understood in part by reference to the configurations of FIGS. 1-2. However, FIGS. 3-4 contain general applicability, and are not limited by other drawing figures and/or prior discussion.

Each process described herein is illustrated as a collection of blocks or operations in a logical flow graph, which represent a sequence of operations that can be implemented in hardware, software, or a combination thereof The processes may include storing, in a memory communicatively coupled to a processor, computer-executable instructions for performing a method, such as a method of visual codebook construction, and executing the instructions on the processor.

In the context of software, the operations represent computer-executable instructions stored on one or more computer-readable storage media 110 that, when executed by one or more processors 108, perform the recited operations. Such storage media 110, processors 108 and computer-readable instructions can be located within an image retrieval system (e.g., image retrieval system 100 of FIG. 1) according to a desired design or implementation. The storage media 110 seen in FIGS. 1, 3 and 4 is representative of storage media generally, both removable and non-removable, and of any technology. Thus, the recited operations represent actions, such as those described in FIGS. 3-4, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of the system 100. Moreover, the computer-readable media may include computer-executable instructions that, when executed by the processor(s) 108, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

FIG. 3 is a flow diagram illustrating an example process 300 by which a visual codebook may be constructed. In one example, the visual codebook may be constructed by a program or application such as the codebook constructor 118, seen in FIG. 1. At operation 302, input with which to construct a visual codebook is received. The visual codebook may be configured similarly to visual codebook 120 (FIG. 1). The input may include N feature points, $X=\{x_1, x_2, \ldots, x_N\}$ and K, a number of clusters to be formed. The feature points may be obtained from regions, portion or "patches" of a plurality of images. The number of clusters, K, may be based in part on the number of feature points.

At operation 304, center points of the K clusters are initialized, such as by $M=\{\mu_1, \mu_2, \ldots, \mu_K\}$. The initialization may be made randomly, or using any other method as desired.

At operation 306, an index is built by a randomized ANN search algorithm, e.g., k-d trees. The index is used to speed up the assignments for each of N feature points to a cluster.

At operation 308, for each of the N feature points, the assignment vector is computed. In one example, the assignment $\hat{a}_n$ is derived from an approximate nearest neighbor algorithm, such as k-d trees. In some examples, the assignment $\hat{a}_n$ includes aspects of randomness. Thereafter, the randomization introduced may be sufficient to overcome pseudo-convergence to a poor solution by changing assignments of some feature points from historical assignments to assignments based on the index.

At operation 310, for each of the N feature points, an assignment $\tilde{a}_n$ is recalled, from a previous iteration (except for the first iteration of the loop).

At operation 312, an assignment is set for each feature point, assigning the feature point to a particular cluster. In one example, the assignment assigns the feature point to a cluster to which it is closer, between the assignment based on $\hat{a}_n$ and the assignment based on $\tilde{a}_n$. In a further example, the assignment may be consistent with Equation (1) in the $t^{th}$ iteration of the loop.

At operation 314, the K centers of the K clusters are updated. In one example, the centers are updated according to:

$$\mu_k = \frac{\sum_n x_n \cdot I(\tilde{a}_n = k)}{\sum_n I(\tilde{a}_n = k)}, \text{ where } I \text{ is an identity matrix} \qquad \text{Eqn (2)}$$

In another example, the centers may be updated by calculating a centroid for each cluster. In one example, at least some clusters may include both feature points whose assignment to the cluster was based on history of a previous loop and feature points whose assignment was based on a nearest neighbor algorithm, such as an ANN algorithm. This is indicated by Equation (1), above.

At operation 316, the loop continues to iterate until a terminating condition is found to be true. In one example, the loop is terminated upon convergence. Convergence may be found when a set percentage (e.g., most, all or a set or determined percentage) of the feature points remain within a same cluster as a previous loop.

At operation 318, output is returned. In one example, the output is the centers of the clusters after convergence, i.e., the centers $\{\mu_1, \mu_2, \ldots, \mu_K\}$. The centers may be used as "visual words," and used to populate a visual codebook, such as the codebook 120 of FIG. 1.

FIG. 4 is a flow diagram illustrating a further example process 400 by which a visual codebook may be constructed. In one example, the visual codebook may be constructed by a program or application such as the codebook constructor 118, seen in FIG. 1. At operation 402, features are extracted from images. The features may be from regions, portions, patches or local areas of the images. At block 404, the features points are quantized into visual words. Optional operations consistent with the quantization are seen in operations 406-416.

At operation 406, an index is built to aid in assignment of feature points to clusters. The index may comprise an assignment vector assigning each feature point to a particular cluster. A nearest neighbor algorithm, such as Approximate Nearest Neighbor (ANN) may be used. Some randomization may be applied to the algorithm, including different randomization with each iteration. The randomization may include the use of trees, such as k-d trees, and random selection of each dimension on the k-d tree, to split a data space.

At operation 408, a distance between the feature point and a center indicated by the ANN algorithm is evaluated and examined. At operation 410, a distance between the feature point and a center of a cluster to which the feature point was previously assigned is examined. Using the distances obtained at operations 408 and 410, it may be determined which center is closer to the feature point. That is, if the feature point is closer to the center indicated by the index created by ANN having elements of randomization, or the center to which the feature point was previously assigned (i.e., having elements of history). Accordingly, at operation 412, each feature point may be assigned to a cluster.

At operation 414, a center is updated for each cluster. The center is updated according to the locations of the feature points assigned to the cluster at operation 412.

At operation 416, the loop continues with further iterations until a termination condition is found to be true. In particular, the loop may continue until the feature points have fully converged. That is, until the feature points have fully or substantially stopped changing assignment between clusters. Thus, the feature points remain fixed and are assigned to only one cluster per iteration. However, during the course of several iterations within the process 400, any particular feature point may be assigned to more than one cluster during different iterations. Reassignment of the feature points should stop when the centers are properly positioned. Once positioned, the centers (e.g., the centers 204-208) may be used to populate a visual codebook, such as visual codebook 120 of FIG. 1. A populated visual codebook may be used to quantize additional feature points into visual words.

At operation 418, images may be retrieved using information retrieval techniques configured for indexed visual words. For example, classical information retrieval techniques may be used to retrieve images.

Example Algorithm

An example algorithm that may be used in visual codebook construction is indicated below.

Input: N feature points $X=\{x_1, x_2, \ldots, x_N\}$ and K, a number of clusters to be formed.

Output: a codebook with K centers $\{\mu_1, \mu_2, \ldots, \mu_K\}$.

Initialize: $M=\{\mu_1, \mu_2, \ldots, \mu_K\}$. The initialization may be made in any way desired, such as randomly.

Repeat until:

a. Build an index, such as by ANN techniques. The ANN techniques may include some aspects of randomization.

b. For n=1 to N, assign each feature point $x_n$ to a cluster. For example, obtain $\hat{a}_n$ from the index having aspects of randomization and obtain $\tilde{a}_n$ from a previous or historical assignment of $x_n$ to a cluster.

c. Set the assignment to $x_n$ according to:

$$\tilde{a}_n^{(t)} = \begin{cases} \hat{a}_n^{(t)}, & \text{if } \|x_n - \mu_{\hat{a}_n^{(t)}}^{(t-1)}\|^2 < \|x_n - \mu_{\tilde{a}_n^{(t-1)}}^{(t-1)}\|^2 \\ \tilde{a}_n^{(t-1)}, & \text{otherwise,} \end{cases}$$

d. End "for."

e. Update the centers in each cluster. A location of a center may change due to changes in the feature points assigned that cluster. Update the centers in the K clusters according to:

For k=1 to K, do $$\mu_k = \frac{\sum_n x_n \cdot I(\tilde{a}_n = k)}{\sum_n I(\tilde{a}_n = k)}.$$

f. End "for."

End "Repeat until" (if the termination condition is satisfied). The termination condition may indicate a degree to which the feature points must converge. For example, the repeat loop may end when no feature points have changed assignment to a different cluster.

Return: $\{\mu_1, \mu_2, \ldots, \mu_K\}$. The algorithm returns the centers of the clusters, after the feature points have converged to their respective clusters. The centers may be used as visual words in a visual codebook.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable media storing computer-executable instructions that, when executed, cause one or more processors to perform acts comprising:
    controlling the one or more processors configured with executable instructions to perform:
    defining N feature points in a codebook of K words;
    initializing centers in each of K clusters, the K clusters representing a distribution of the N feature points;
    repeating a loop, and within the loop, performing:
        building an index assigning each feature point to a cluster according to an approximate nearest neighbor (ANN) algorithm having random aspects;
        assigning each feature point to a cluster according to a comparison of an assignment indicated by the index and a previous assignment of that feature point from a previous iteration of the loop;
        updating a center of each cluster to reflect the assigning; and
        terminating the loop upon convergence.

2. One or more computer-readable media as recited in claim 1, wherein building the index includes:
    introducing different randomization in the building of the index in each iteration of the loop.

3. One or more computer-readable media as recited in claim 1, wherein building the index includes:
    building the index using a different k-d trees or k-means trees for each iteration of the loop.

4. One or more computer-readable media as recited in claim 1, wherein building the index includes:
    performing an approximate nearest neighbor search using a k-d trees or k-means trees; and
    introducing the random aspects to the index by randomly selecting one dimension on the k-d tree to split a data space.

5. One or more computer-readable media as recited in claim 1, wherein assigning each feature point includes:
    searching the index for an assignment for each feature point; and
    selecting between the assignment found in the index for the feature point and the previous assignment used for that feature point.

6. One or more computer-readable media as recited in claim 1, wherein assigning each feature point includes:
    assigning some feature points to clusters based on an assignment history of those feature points within a previous loop; and
    assigning other feature points to clusters based on the index.

7. One or more computer-readable media as recited in claim 1, wherein assigning each feature point includes:
    assigning each feature point to a new cluster if a center of the new cluster is closer to the feature point than to a center of a prior cluster to which the feature point was previously assigned.

8. One or more computer-readable media as recited in claim 1, wherein assigning each feature point includes:
    assigning each feature point to remain in its previous cluster unless closer to a center indicated by the index.

9. One or more computer-readable media as recited in claim 1, wherein assigning each feature point includes:
    assigning some feature points to a cluster based on an assignment history of the feature point within a previous iteration of the loop; and
    assigning other feature points to a cluster based on the index, wherein randomness built into the index is derived from use of a tree.

10. One or more computer-readable media as recited in claim 1, wherein updating the center of each cluster includes:
    calculating a centroid for each cluster, wherein at least some clusters include both feature points whose assignment was based on history of a previous loop and feature points whose assignment was based on an ANN algorithm.

11. A method of codebook construction, comprising:
    controlling one or more processors configured with executable instructions to perform:

defining N feature points in a codebook of K words;
initializing K centers of clusters of the N feature points;
repeating a loop, and within the loop, performing:
- building an index for approximate nearest neighbor search, wherein randomization introduced in the building in each iteration of the loop is different than randomization introduced by previous iterations of the loop;
- assigning each feature point to a cluster, wherein the assigning includes:
  - searching the index for an assignment for each feature point;
  - comparing the assignment from the index to an assignment from a previous iteration; and
  - selecting an assignment that is closer than, or same as, the assignment from the previous iteration;
- updating a center of each cluster; and
- terminating the loop upon satisfaction of a condition.

12. The method of claim 11, wherein the condition is satisfied when fewer than a set percentage of the N feature points remain within a same cluster as a previous loop.

13. The method of claim 11, wherein updating the center of each cluster includes calculating a centroid for each cluster.

14. The method of claim 11, wherein updating the center of each cluster includes:
calculating a centroid for each cluster, wherein at least some clusters include both feature points whose assignment was based on history of a previous iteration of the loop and feature points whose assignment was based on the index and randomization within the index.

15. The method of claim 11, wherein the randomization introduced is sufficient to overcome pseudo-convergence by changing assignments of some feature points from historical assignments to assignments based on the index.

16. The method of claim 11, wherein selecting an assignment that is closer than, or same as, the assignment from the previous iteration additionally includes:
assigning some feature points to clusters, wherein the assignments are based on an assignment history of the feature point within a previous iteration of the loop; and
assigning other feature points to clusters, wherein the assignments are based on approximate nearest neighbor search results.

17. The method of claim 11, wherein building the index includes:
building the index using a different tree for each iteration of the loop.

18. A content-based image retrieval system, comprising:
a processor;
a memory; and
a codebook constructor, configured by executable statements defined in the memory, execution of the executable statements by the processor performing actions comprising:
extracting feature points from images; and
clustering the feature points, the clustering including repeating a loop, within which the loop performs actions comprising:
- building an index for approximate nearest neighbor search to aid in assigning the local features to clusters, the building introducing randomization sufficient to overcome pseudo-convergence to a poor solution, the randomization being different for each iteration of the loop;
- assigning each feature point to a cluster, wherein the assigning examines a distance between the feature point and a center indicated by the index and a distance between the feature point and a center of a cluster to which the feature point was previously assigned in a previous iteration of the loop;
- updating a center of each cluster, the updating including calculating a centroid for each cluster, wherein at least some clusters include both feature points whose assignment was based on history of the previous iteration of the loop and feature points whose assignment was based on the index; and
- terminating the loop upon convergence, the convergence being satisfied when at least a set percentage of the feature points remain within a same cluster as a previous loop.

19. The system of claim 18, wherein:
a codebook, created by the codebook constructor, quantizes additional feature points into visual words to be indexed; and
a search procedure retrieves images using information retrieval techniques adapted to the indexed visual words.

20. The system of claim 18, wherein building the index includes:
performing an approximate nearest neighbor search using a k-d tree; and
introducing the random aspects to the index by randomly selecting one dimension on the k-d tree to split a data space.

* * * * *